US012194324B2

(12) United States Patent
Yang et al.

(10) Patent No.: US 12,194,324 B2
(45) Date of Patent: Jan. 14, 2025

(54) SWIVEL ANCHOR POINT

(71) Applicant: BEXUS INDUSTRIES CO., LTD., Taichung (TW)

(72) Inventors: Kai-Chieh Yang, Taichung (TW); Chia Cheng Huang, Taichung (TW)

(73) Assignee: BEXUS INDUSTRIES CO., LTD., Taichung (TW)

( * ) Notice: Subject to any disclaimer, the term of this patent is extended or adjusted under 35 U.S.C. 154(b) by 0 days.

(21) Appl. No.: 18/218,554

(22) Filed: Jul. 5, 2023

(65) Prior Publication Data

US 2024/0408422 A1 Dec. 12, 2024

(30) Foreign Application Priority Data

Jun. 6, 2023 (TW) ................................ 112121040

(51) Int. Cl.
*A62B 35/00* (2006.01)
*E04G 21/32* (2006.01)

(52) U.S. Cl.
CPC ...... *A62B 35/0062* (2013.01); *E04G 21/3276* (2013.01)

(58) Field of Classification Search
CPC ........................ A62B 35/0062; E04G 21/3276
See application file for complete search history.

(56) References Cited

U.S. PATENT DOCUMENTS 3,297,293 A * 1/1967 Andrews ................. B66C 1/666 294/215
4,558,979 A * 12/1985 Andrews ................. F16G 15/08 248/500
4,705,422 A * 11/1987 Tsui .......................... B66C 1/66 294/215
5,352,056 A * 10/1994 Chandler ................ F16G 15/08 403/57
5,586,801 A * 12/1996 Sawyer ..................... B66C 1/66 294/215
5,848,815 A * 12/1998 Tsui .......................... B66C 1/66 294/215
5,975,786 A * 11/1999 Chang ..................... F16G 15/08 116/212
6,199,925 B1 * 3/2001 Alba ......................... B66C 1/66 294/215
6,264,013 B1 * 7/2001 Hodgins ................. B66C 3/005 188/83
6,349,985 B1 * 2/2002 Aston ....................... B66C 1/66 294/215

(Continued)

*Primary Examiner* — Monica E Millner
(74) *Attorney, Agent, or Firm* — Ying-Ting Chen

(57) ABSTRACT

The invention is composed of a main member, a bearing, a brake ring and a detection structure. The main member has a middle hole for installing the bearing, a first pivot portion supporting a first shaft, and a second pivot portion supporting a second shaft. The first and second shafts are arranged coaxially and perpendicular to the middle hole. The brake ring has a brake hole, a first arm coupled with the first shaft, a second arm coupled with the second shaft. The detection structure is to keep the brake ring at the first position, so that the brake ring is allowed to rotate around the bearing with the first and second shaft. However, when the brake ring is subjected to a set stress to control the displacement of the brake ring to the second position. Therefore, the displacement change of the brake ring can be visually detected.

20 Claims, 10 Drawing Sheets

(56) References Cited

U.S. PATENT DOCUMENTS

| | | | | |
|---|---|---|---|---|
| 6,652,012 | B1 * | 11/2003 | Fuller | B66C 1/66 294/215 |
| 7,958,614 | B2 * | 6/2011 | Popenoe | F16B 31/025 411/13 |
| 8,424,638 | B1 * | 4/2013 | Guthrie | E04G 21/3276 248/499 |
| 8,562,053 | B2 * | 10/2013 | Davidson | B66C 1/10 294/215 |
| 9,302,889 | B2 * | 4/2016 | Bateman | B66C 15/065 |
| 10,232,199 | B2 * | 3/2019 | Perner | A62B 35/0037 |
| 10,450,174 | B1 * | 10/2019 | Kucinic | F16B 45/00 |
| 11,167,957 | B1 * | 11/2021 | Striebel | B66C 1/66 |
| 11,807,499 | B2 * | 11/2023 | Guthrie | F16B 13/0891 |
| 2011/0037279 | A1 * | 2/2011 | Alba | F03D 13/10 294/215 |
| 2014/0327262 | A1 * | 11/2014 | Alba | B66C 1/66 294/215 |

* cited by examiner

SWIVEL ANCHOR POINT

BACKGROUND OF THE PRESENT INVENTION

Field of Invention

The present invention provides a swivel anchor point that allows visual inspection, thereby providing a judgment on whether the construction personnel choose or replace.

Description of Related Arts

It is noted that the conventional swivel anchor point is as shown in the pre-patent case of U.S. Pat. Nos. 6,953,212, 8,424,638, etc., which needs to be pre-fixed at the height of the building by the expansion screw (anchor) to provide the fall arrester carried by the construction personnel for buckling, so that it meets the regulations of high-altitude operation. Therefore, when the construction personnel accidentally fall, the fall arrester can be supported by the swivel anchor point and then the construction personnel can be suspended in mid-air for subsequent rescue.

It can be seen that the fall arrester and the swivel anchor point need to withstand the extreme gravitational acceleration of the construction personnel when they fall. Therefore, the conventional fall arrester industry has standardized the need to set up an alarm configuration that can be visually inspected to determine whether the fall arrester has withstood the stress of accidental fall by construction personnel, so that construction personnel can prevent or replace it. However, the conventional swivel anchor point still has some disadvantages, because the swivel anchor point will also accumulate fatigue when it is subjected to the stress of accidental falls by construction personnel, and its reliability will be more or less reduced, especially when the weight of the falling construction personnel is relatively heavy, the swivel anchor point does have safety concerns for repeated use.

In view of the fact that the conventional swivel anchor point has the disadvantage of not being able to visually check whether it has withstood the falling stress of the construction personnel, which in turn causes the relevant construction personnel to have no choice or response, so there is a problem of insufficient safety. Therefore, the inventors carefully researched and improved, and finally developed a swivel anchor point that allows easy visual inspection to provide the construction personnel with the response.

SUMMARY OF THE PRESENT INVENTION

The present invention provides a swivel anchor point, which includes a main member, a bearing supporting the main member to rotate itself, and a brake ring coupled to the main member. The bearing is allowed to be penetrated by expansion screw, so as to detachably fix the main member to a proper position of the building, wherein the brake ring is coupled to the main member through the first and second shafts, so that it is sufficient to provide the fall arrester carried by the construction personnel for buckling;

The main content of the present invention is that: a detection structure is provided at an appropriate position of the brake ring or the main member to keep the brake ring at a first position, so that the brake ring allows the first shaft and the second shaft to serve as swing fulcrums, and draws the main member to rotate around the bearing, wherein when the brake ring is subjected to the set stress, further control the first shaft and second shaft are sufficient to damage or deform the detection structure to control the displacement of the brake ring to a second position, so as to visually detect the displacement change of the brake ring and judge that the swivel anchor point is in a state of bearing a set stress, thereby providing construction personnel with a basis for judging selection or replacement.

Another content of the present invention is to control the bearing to be installed on the main member in a detachable manner, which is widely applied to the expansion screws of different diameters by replacing different bearings, so as to effectively increase the elasticity required by different strengths or environmental use.

DETAILED DESCRIPTION OF THE PREFERRED EMBODIMENT

Figure 1:
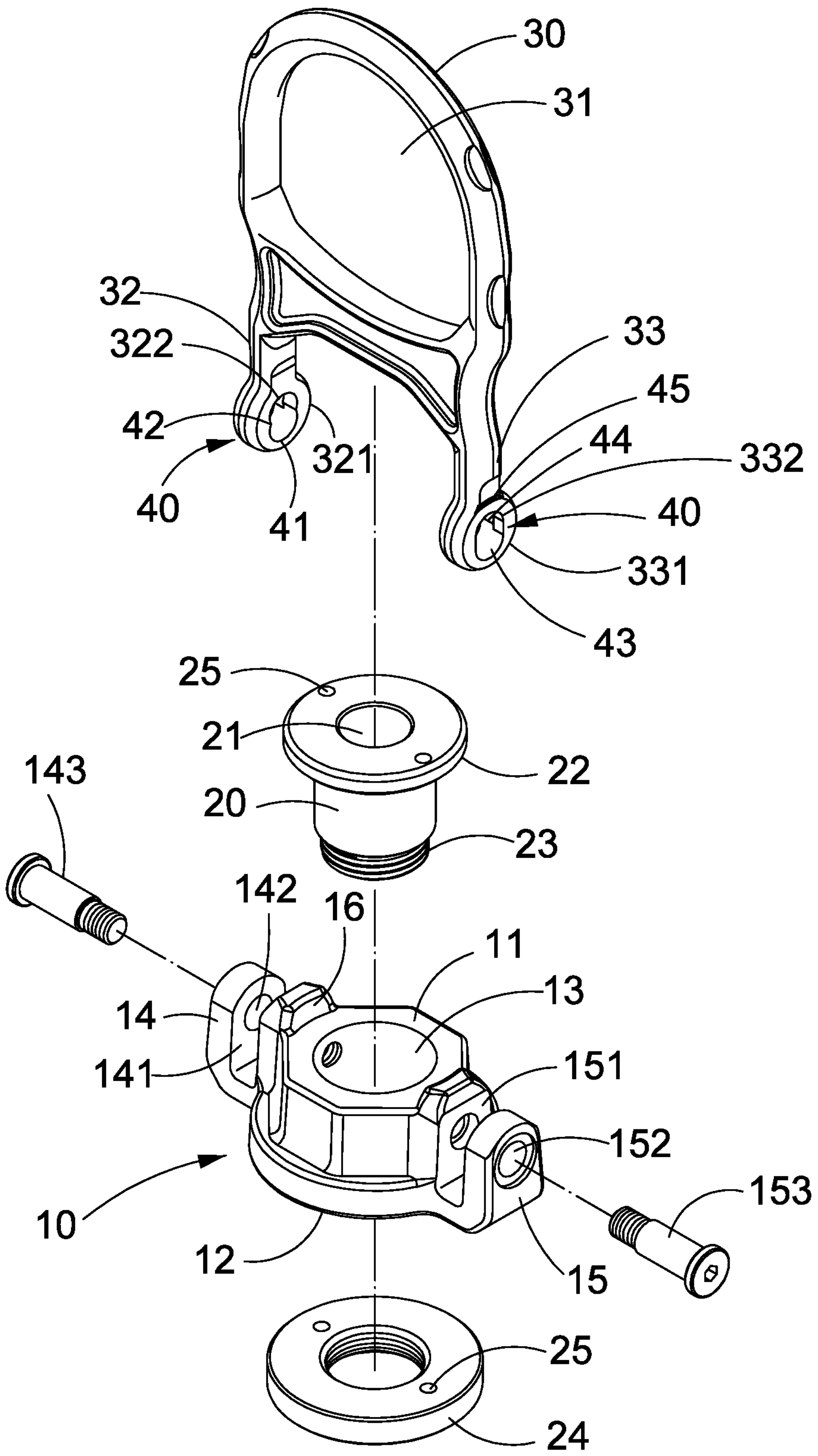
FIG. 1 is an exploded view according to the present invention.
Figure 2:
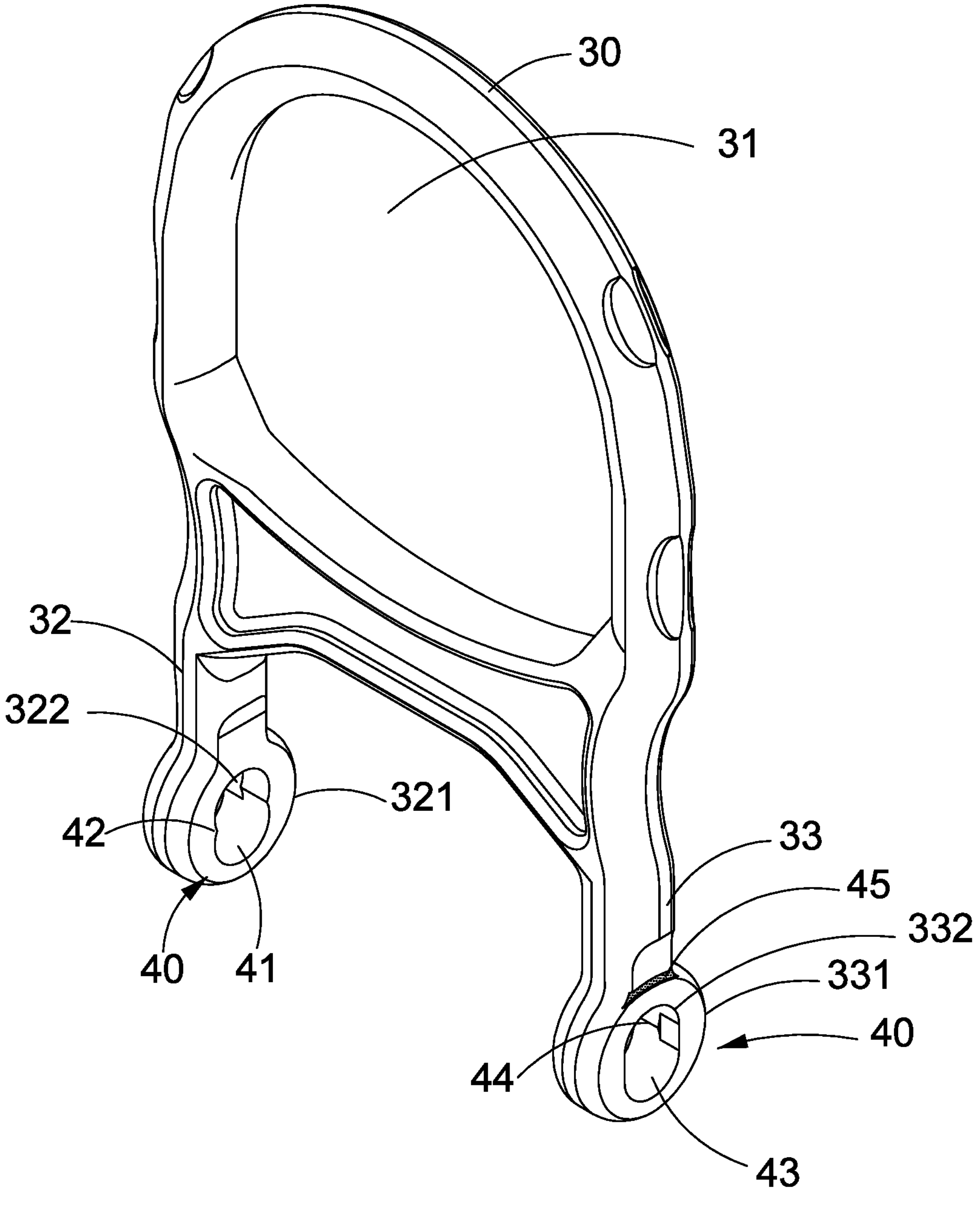
FIG. 2 is an enlarged view of the brake ring in FIG. 1, which is used to illustrate the detection structure.
Figure 3:
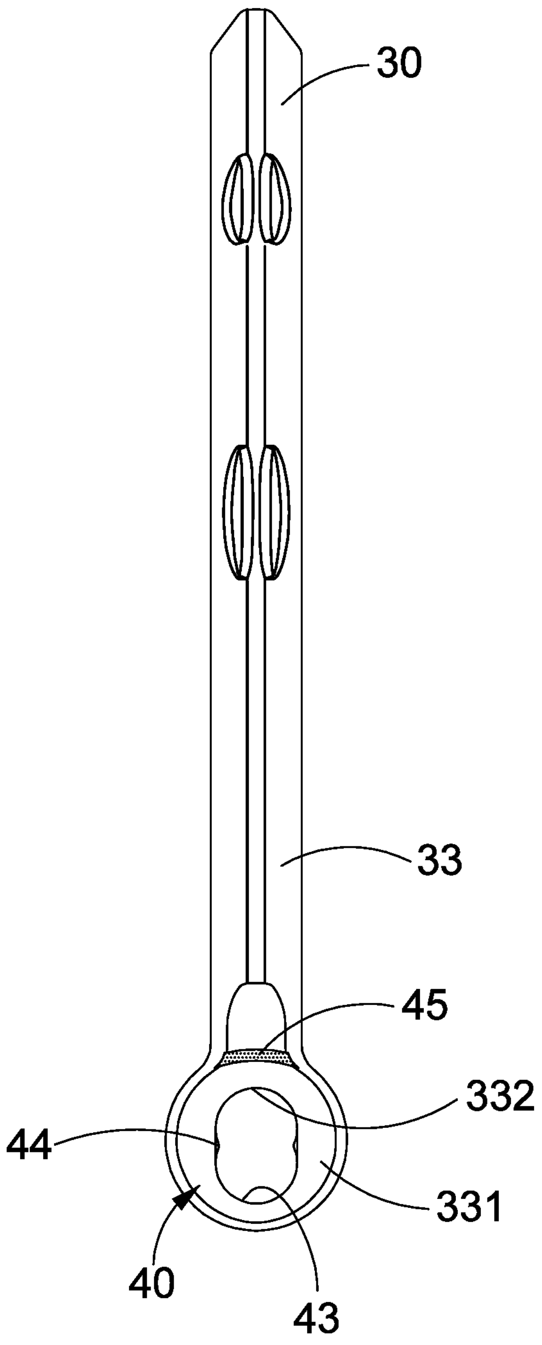
FIG. 3 is a side view of FIG. 2.
Figure 4:
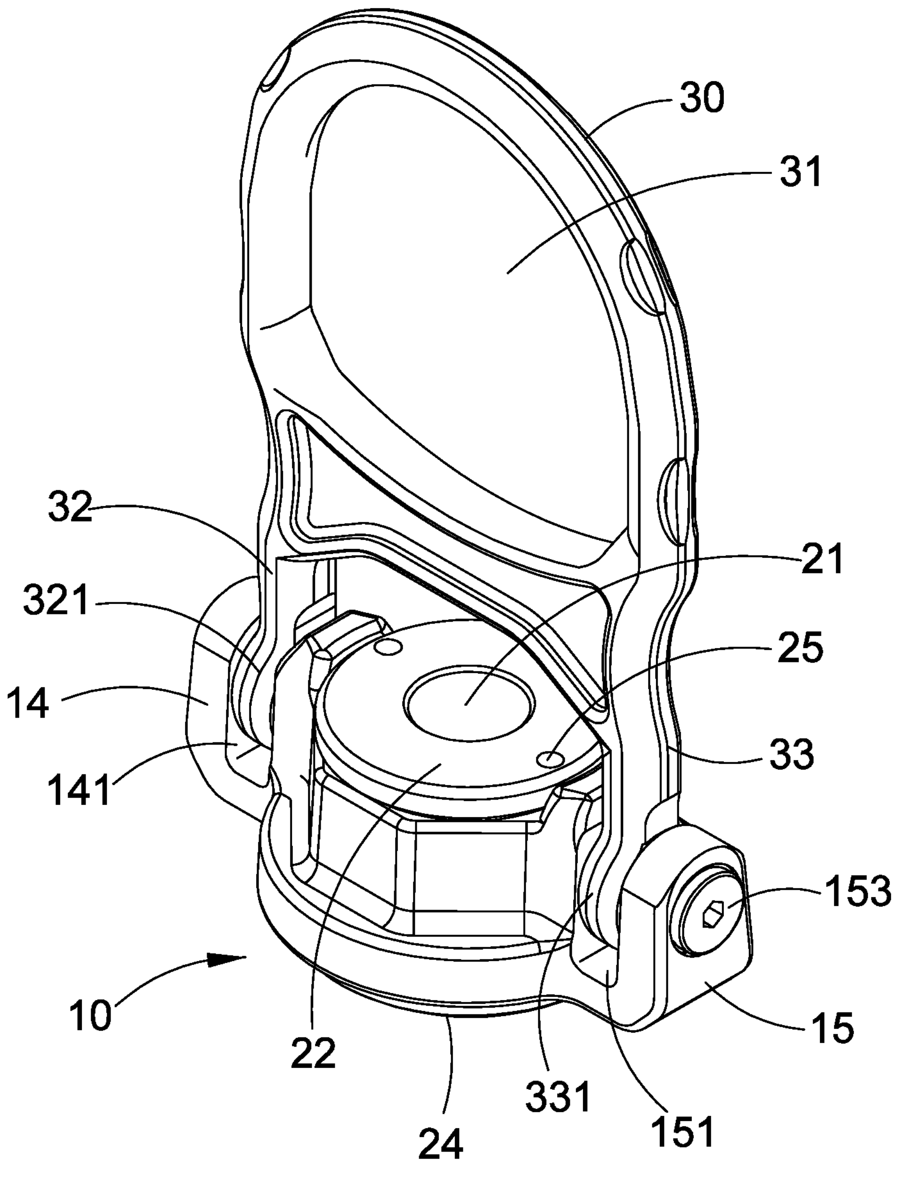
FIG. 4 is a perspective view of the brake ring held in the first position of the present invention.
Figure 5:
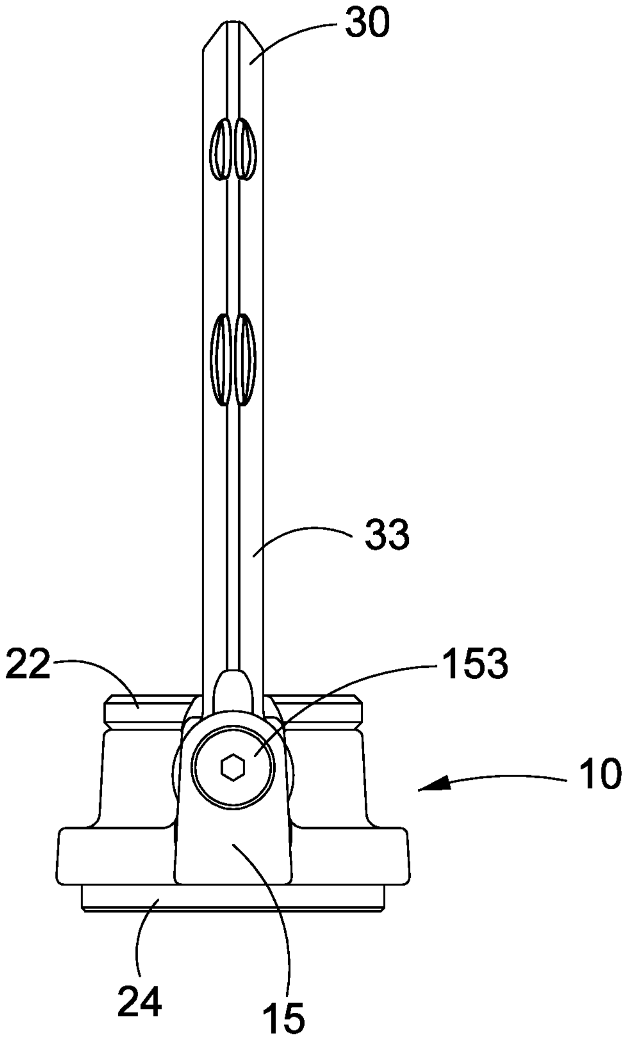
FIG. 5 is a side view of FIG. 4.
Figure 6:
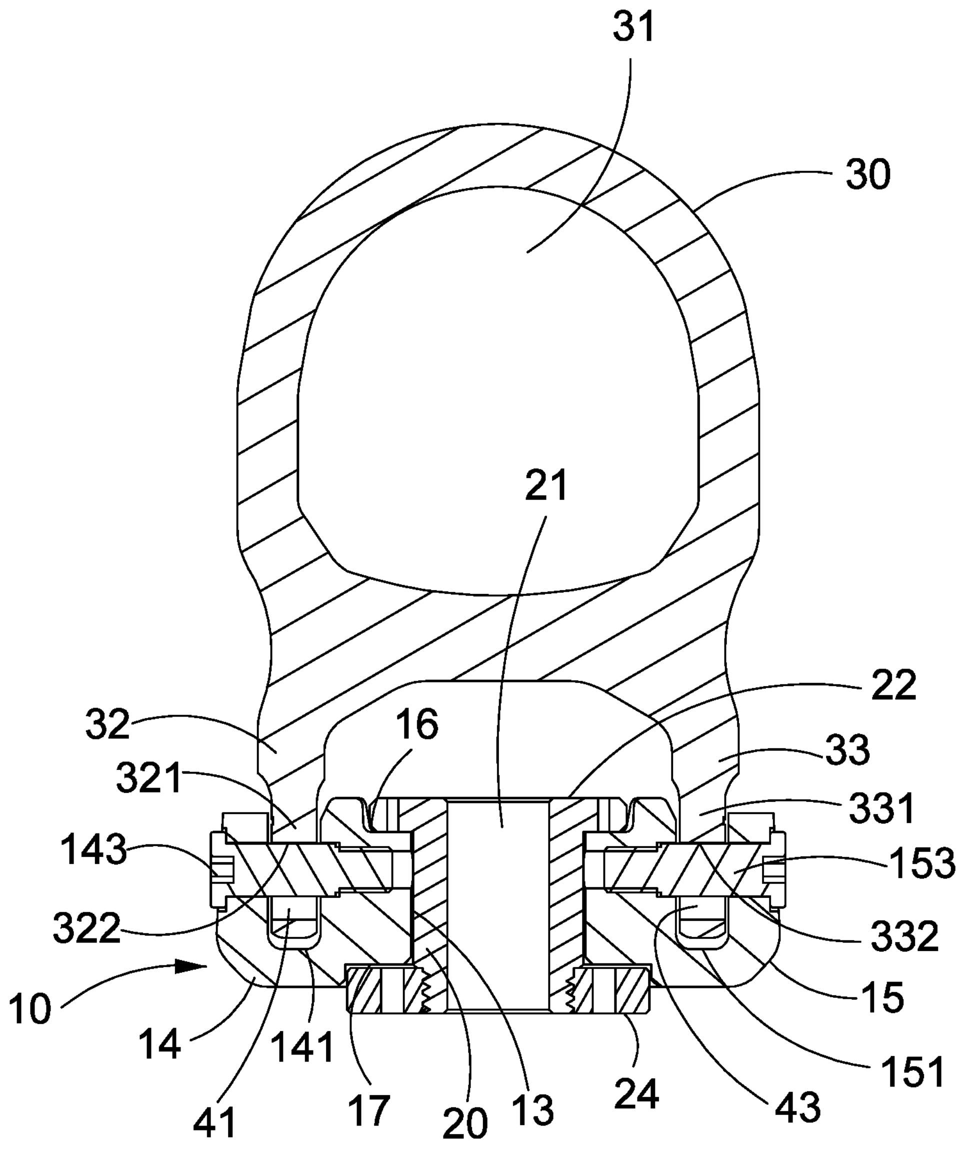
FIG. 6 is a sectional view of FIG. 4.
Figure 7:
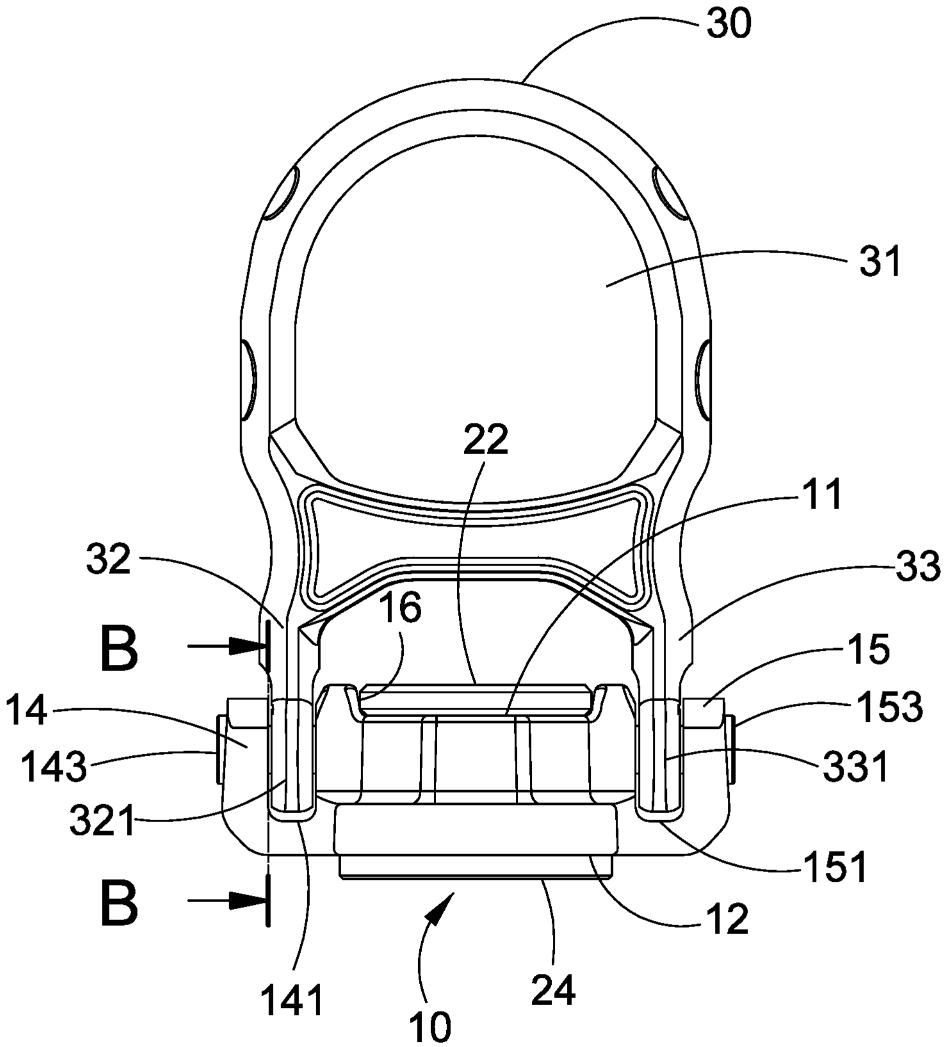
FIG. 7 is a front view of FIG. 4.
Figure 8:
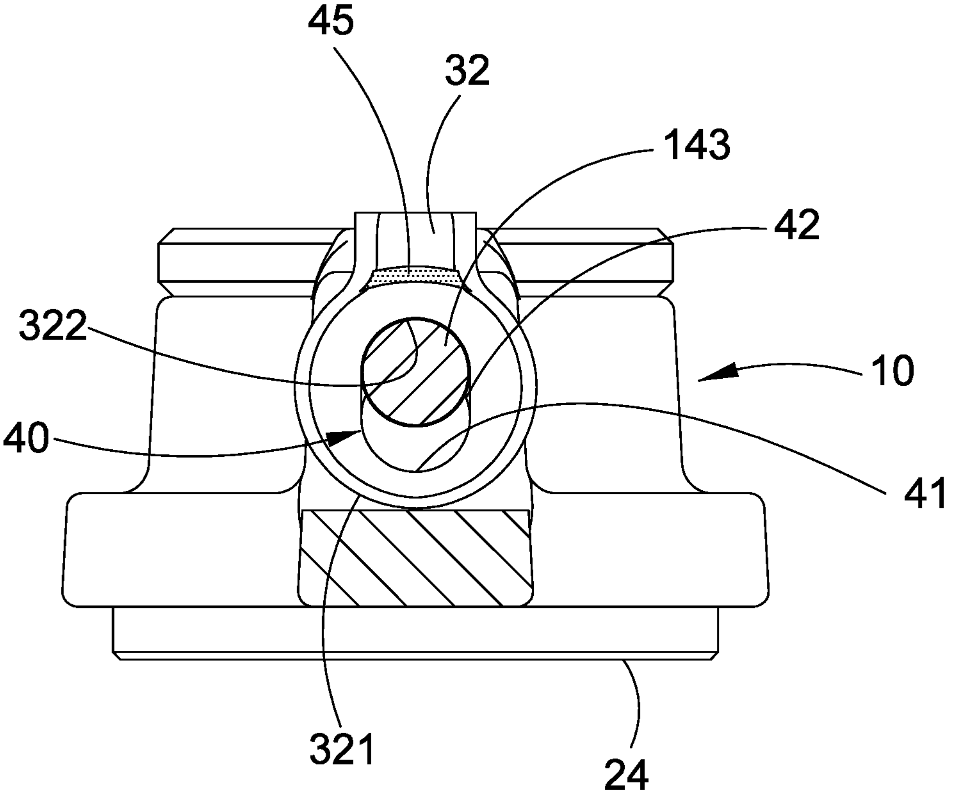
FIG. 8 is a partial sectional view of the B-B in FIG. 7, which is used to illustrate the relative position of the first shaft and the second shaft when the brake ring is in the first position.
Figure 9:
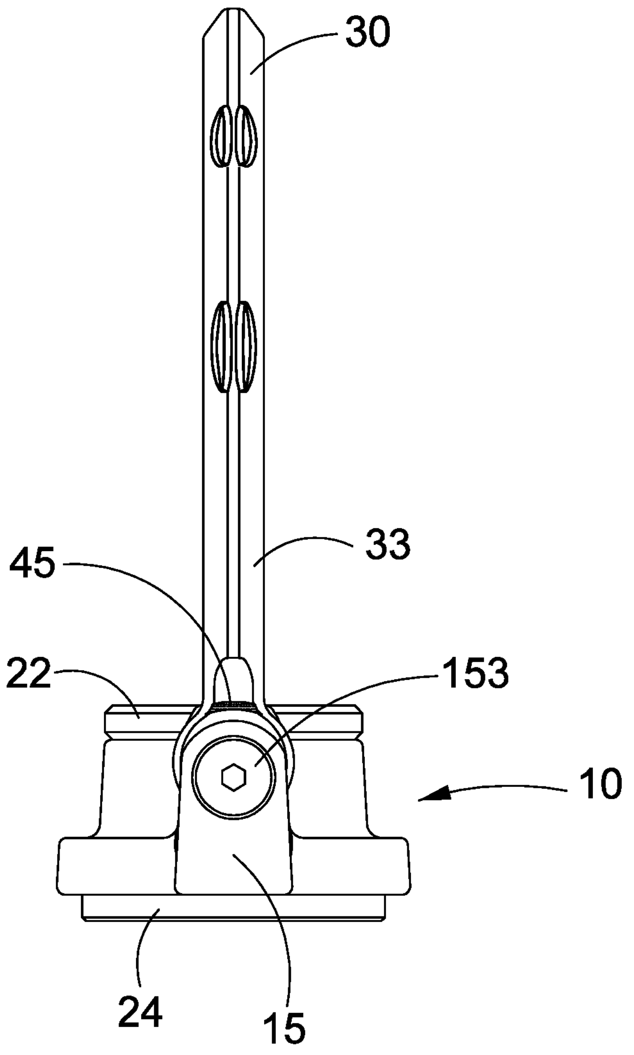
FIG. 9 is a side view of the brake ring in the second position of the present invention.
Figure 10:
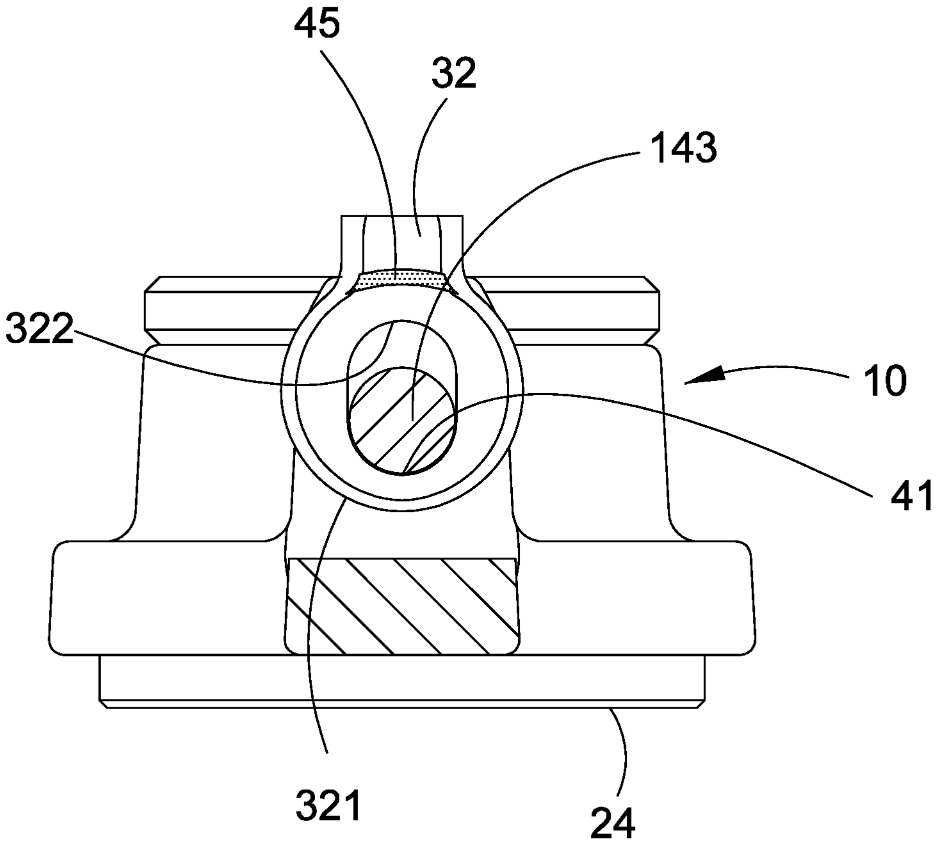
FIG. 10 is a partial sectional view of FIG. 9, which is used to illustrate the relative position of the first shaft and the second shaft.

Referring to FIGS. 1 to 8, the present invention comprises:

a main member (10), which has a middle hole (13) longitudinally penetrating through a first end face (11) and a second end face (12), a first pivot portion (14) on one side of the middle hole (13), and a second pivot portion (15) on the other side of the middle hole (13); wherein the first pivot portion (14) has a first groove (141), a first shaft hole (142) across the first groove (141), a first shaft (143) mounted in the first shaft hole (142), so that the first shaft (143) vertically intersects with the first groove (141), has an inner edge threadedly fitted with an inner edge of the first shaft hole (142), and a cap head capable of abutting against the outside of the first pivot portion (14) is provided at an outer end thereof, so that the first pivot portion (14) is sufficient to support the first shaft (143); wherein the second pivot portion (15) has a second groove (151), a second shaft hole (152) across the second groove (151), a second shaft (153) mounted in the second shaft hole (152), so that the second shaft (153) vertically intersects the second groove (151), has an inner edge threadedly fitted with an inner edge of the second shaft hole (152), and a cap head capable of abutting against the outside of the second pivot portion (15) is provided at an outer end thereof, so that the second pivot portion (15) is sufficient to support the second shaft (153);

wherein the first shaft (143) and the second shaft (153) are arranged in the same central axis, and are perpendicular to the central axis of the middle hole (13); wherein the first shaft (143) and the second shaft (153) are allowed to be installed in the corresponding first shaft hole (142) and the second shaft hole (152) by screwing, and the equivalent riveting or other structural configurations are also allowed;

a bearing (20), which is installed in the middle hole (13), and has a mounting hole (21) on the same central axis as the middle hole (13), wherein the mounting hole (21) is allowed for the expansion screw (not shown in the figure) to penetrate and fix the main member (10) and bearing (20) in a removable manner in the appropriate position of the building, so that the main member (10) may be allowed to rotate around the bearing (20) in response to the normal movement of the construction personnel at high altitude; preferably, the bearing (20) is dismountable mounted in the middle bore (13), by replacing the bearing (20) with mounting hole (21) with different diameter, that is, it is allowed to be widely applicable to expansion screws with different diameters, effectively gaining flexibility for different strengths or environmental requirements, specifically, the bearing (20) has a shoulder (22) capable of abutting against the first end face (11), and a screw portion (23) capable of protruding from the bottom end of the middle hole (13), and a nut (24) capable of abutting against the second end face (12), which screws with the screw portion (23), so that the bearing (20) is allowed to be detachably installed in the middle hole (13), wherein the shoulder (22) and the nut (24) each have a wrenching part (25) on which hand tools are easy to apply force, so as to allow the bearing (20) to be disassembled and assembled more easily, and in addition, in order to reduce the friction or interference caused by the protrusion of the shoulder (22) and the nut (24), a concave area (16) capable of accommodating the shoulder (22) is defined above the first end surface (11), and a recessed area (17) capable of accommodating the nut (24) is recessed under the second end surface (12);

a brake ring (30) has a brake hole (31) for the buckle connection of the fall arrester, and a first arm (32) and a second arm (33) symmetrically extending from both sides of the brake hole (31); wherein the first arm (32) has a first slide (321) matched to the first groove (141), and a first connection hole (322) coupled with the first shaft (143); wherein the second arm (33) has a second slide (331) matched to the second groove (151), and a second connection hole (332) coupled to the second shaft (153); and a detection structure (40), arranged on the brake ring (30) or the main member (10), as shown in FIGS. 4 to 8, wherein the first shaft (143) is held in the first connection hole (322) and the second shaft (153) is held in the second connection hole (332), in order to control the brake ring (30) to remain in a first position, so that the brake ring (30) is allowed to use the first shaft (143) and the first connection hole (322), the second shaft (153) and the second connection hole (332) as swing fulcrums, and pull the main member (10) to rotate around the bearing (20), thereby providing construction personnel with the ability to move normally at high altitude, but when the brake ring (30) is subjected to the set stress generated when the construction personnel accidentally falls, as shown in FIGS. 9 and 10, further control the first shaft (143) and second shaft (153) to generate forces sufficient to damage or deform the detection structure (40), causing relative displacement of the first shaft (143) and second shaft (153), and displacement of the brake ring (30) to the second position, so that it is sufficient to visually detect the displacement change of the brake ring (30), so as to judge that the swivel anchor point is in a state of bearing the set stress, and provide construction personnel with a judgment on whether to select or replace the swivel anchor point; FIGS. 1 and 10 specifically disclose how the detection structure (40) is arranged on the brake ring (30), wherein the detection structure (40) mainly has a third connection hole (41) penetrating through the first slide (321) and parallel to and communicating with the first connection hole (322), wherein the diameter of the third connection hole (41) is equivalent to that of the first connection hole (322) to allow the first shaft (143) to be combined and aligned, and a first necking channel is formed between the third connection hole (41) and the first connection hole (322), wherein both sides of the necking channel form a first stopper (42), which is used to restrict the first shaft (143) entering the third connection hole, so as to control the first shaft (143) to remain in the first connection hole (322), however, when the brake ring (30) is subjected to the set stress, the first shaft (143) generates enough force to pass through the first stopper (42) to be relatively displaced to the third connection hole (41), so that the brake ring (30) is shifted from the first position to the second position; similarly, the detection structure (40) mainly has a fourth connection hole (43) penetrating through the second slide (331) and parallel to and communicating with the second connection hole (332), wherein the diameter of the fourth connection hole (43) is equivalent to that of the second connection hole (332) to allow the second shaft (153) to be combined and aligned, and a second necking channel is formed between the fourth connection hole (43) and the second connection hole (332), wherein both sides of the necking channel form a second stopper (44), which is used to restrict the second shaft (153) entering the fourth connection hole (43), so as to control the second shaft (153) to remain in the second connection hole (332), however, when the brake ring (30) is subjected to the set stress, the second shaft (153) generates enough force to pass through the second stopper (44) to be relatively displaced to the fourth connection hole (43), so that the brake ring (30) is shifted from the first position to the second position; wherein, in order to improve the visual detection effect, referring to FIGS. 1, 5 and 9, the first slide (321) and the second slide (331) are provided with danger marks (45) at appropriate positions, when the brake ring (30) is kept at the first position, the danger marks (45) are hidden in the matched first groove (141) and the second groove (151), however, when the brake ring (30) is in the second position, the danger marks (45) are controlled to displace out of the matched first groove (141) and the second groove (151), so that the construction personnel are allowed to visually check whether there are danger marks (45), and select a relatively safe swivel anchor point to buckle the fall arrester, or update the swivel anchor point, so as to overcome the fatigue accumulation problem of repeated use of conventional rotating anchor points, and greatly improve the safety of construction personnel when they stumble and fall.

FIGS. 1 to 10 disclose the technology in which the detection structure (40) is specifically arranged on the first arm (32) and the second arm (33) of the brake ring (30), wherein the detection structure (40) can also be equivalently converted and applied to the first pivot portion (14) and second pivot portion (15) of the main member (10), which is sufficient as the second embodiment of the detection structure (40). Further, the third embodiment of the detection structure (40) can increase the diameter of the first connection hole (322) and the second connection hole (332), and then between the first shaft (143) and the first connection hole (322), and between the second shaft (153) and the second connection hole (332), respectively, ductility bushings are installed for compensation, so that each bushing is sufficient to keep the brake ring (30) in the first position. However, when the brake ring (30) is subjected to the set stress, the first shaft (143) and second shaft (153) are controlled to generate a force sufficient to deform the bushings, causing the brake ring (30) to shift to the second position, so that it can be visually detected that the brake ring (30) is in an identifiable state that has been subjected to the set stress. Similarly, the bushings can also be equivalently transferred between the first shaft hole (142) and the first shaft (143), the second shaft hole (152) and the second shaft (153) individually or simultaneously.

In summary, the overall structural features of the present invention can be said to be unprecedented in the conventional structure, and it is a very outstanding and excellent design, and there are no similar inventions or publications in similar products, so it meets the application requirements of the invention patent, and the application is filed according to law. However, the above is only one of the better embodiments of the present invention, and it cannot be used to limit the scope of the exploitation of the present invention, that is, all equivalent changes and modifications made according to the patent scope of the present invention belong to the scope of the present invention.

What is claimed is:

1. A swivel anchor point, comprising:

a main member, which has a middle hole arranged therein, a first pivot portion located on one side of the middle hole, and a second pivot portion located on the other side of the middle hole, wherein the first pivot portion has a first shaft supported thereon, the second pivot portion has a second shaft supported thereon, so that the first shaft and the second shaft are on the same central axis, and perpendicular to the central axis of the middle hole;

a bearing installed in the middle hole, which has a mounting hole with the same central axis as the middle hole; and a brake ring, which has a brake hole arranged therein, a first arm coupled with the first shaft, a second arm coupled with the second shaft, the brake ring allows the first shaft and the second shaft to serve as swing fulcrums, and draws the main member to rotate around the bearing, wherein the brake ring has a danger mark arranged thereon, so that when the brake ring is kept in a first position, the danger mark is hidden on the main member, when the brake ring is in a second position, the danger sign is controlled to escape from the main member.

2. The swivel anchor point, as recited in claim 1, wherein the bearing is detachably installed in the middle hole.

3. The swivel anchor point, as recited in claim 2, wherein the main member has a first end face and a second end face for the middle hole to penetrate longitudinally; wherein the bearing has a shoulder abutted against the first end face, and a screw portion protruded from the bottom end of the middle hole, and a nut abutted against the second end face, which screws with the screw portion, wherein the shoulder and the nut each have a wrenching part arranged thereon.

4. The swivel anchor point, as recited in claim 1, wherein the first pivot portion has a first groove, a first shaft hole across the first groove, the first shaft mounted in the first shaft hole, so that the first shaft vertically intersects with the first groove; wherein the second pivot portion has a second groove, a second shaft hole across the second groove, the second shaft mounted in the second shaft hole, so that the second shaft vertically intersects the second groove; wherein the first arm has a first slide matched to the first groove, and a first connection hole coupled with the first shaft; wherein the second arm has a second slide matched to the second groove, and a second connection hole coupled to the second shaft.

5. The swivel anchor point, as recited in claim 2, wherein the first pivot portion has a first groove, a first shaft hole across the first groove, the first shaft mounted in the first shaft hole, so that the first shaft vertically intersects with the first groove; wherein the second pivot portion has a second groove, a second shaft hole across the second groove, the second shaft mounted in the second shaft hole, so that the second shaft vertically intersects the second groove; wherein the first arm has a first slide matched to the first groove, and a first connection hole coupled with the first shaft; wherein the second arm has a second slide matched to the second groove, and a second connection hole coupled to the second shaft.

6. The swivel anchor point, as recited in claim 4, further comprising a detection structure is arranged on the first arm and the second arm, and is composed of a third connection hole, a first stopper, a fourth connection hole and a second stopper; wherein the third connection hole is arranged through the first slide and communicates with the first connection hole in parallel, so that the first stopper is formed between the third connection hole and the first connection hole to restrict the first shaft from being kept in the first connecting hole; wherein the fourth connection hole is arranged through the second slide and communicates with the second connection hole in parallel, so that the second stopper is formed between the fourth connecting hole and the second connecting hole to restrict the second shaft from being kept in the second connecting hole, wherein when synchronously matching with the first shaft to keep in the first connecting hole, so as to control the brake ring to keep in the first position; wherein when the brake ring is subjected to a set stress, the first shaft is controlled to be relatively displaced to the third connection hole, and the second shaft is controlled to be relatively displaced to the fourth connection hole, so that the brake ring is displaced from the first position to the second position.

7. The swivel anchor point, as recited in claim 5, further comprising a detection structure is arranged on the first arm and the second arm, and is composed of a third connection hole, a first stopper, a fourth connection hole and a second stopper; wherein the third connection hole is arranged through the first slide and communicates with the first connection hole in parallel, so that the first stopper is formed between the third connection hole and the first connection hole to restrict the first shaft from being kept in the first connecting hole; wherein the fourth connection hole is arranged through the second slide and communicates with the second connection hole in parallel, so that the second stopper is formed between the fourth connecting hole and the second connecting hole to restrict the second shaft from being kept in the second connecting hole, wherein when synchronously matching with the first shaft to keep in the first connecting hole, so as to control the brake ring to keep in the first position; wherein when the brake ring is subjected to a set stress, the first shaft is controlled to be relatively displaced to the third connection hole, and the second shaft is controlled to be relatively displaced to the fourth connection hole, so that the brake ring is displaced from the first position to the second position.

8. The swivel anchor point, as recited in claim 4, further comprising a detection structure is arranged on the first arm and the second arm, which by increasing the diameter of the first connection hole and second connection hole, is installed ductility bushings between the first shaft and the first connection hole, and between the second shaft and the second connection hole for compensation, so that the bushings are enough to keep the brake ring in the first position, but when the brake ring is subjected to a set stress, the first shaft and second shaft are controlled to generate a force sufficient to deform the bushings, causing the brake ring to shift to the second position.

9. The swivel anchor point, as recited in claim 5, further comprising a detection structure is arranged on the first arm and the second arm, which by increasing the diameter of the first connection hole and second connection hole, is installed ductility bushings between the first shaft and the first connection hole, and between the second shaft and the second connection hole for compensation, so that the bushings are enough to keep the brake ring in the first position, but when the brake ring is subjected to a set stress, the first shaft and second shaft are controlled to generate a force sufficient to deform the bushings, causing the brake ring to shift to the second position.

10. The swivel anchor point, as recited in claim 4, further comprising a detection structure is arranged on the first pivot portion and the second pivot portion.

11. The swivel anchor point, as recited in claim 5, further comprising a detection structure is arranged on the first pivot portion and the second pivot portion.

12. A swivel anchor point, comprising:

a main member, which has a middle hole arranged therein, a first pivot portion located on one side of the middle hole, and a second pivot portion located on the other side of the middle hole, wherein the first pivot portion has a first shaft supported thereon, the second pivot portion has a second shaft supported thereon, so that the first shaft and the second shaft are on the same central axis, and perpendicular to the central axis of the middle hole, wherein the first pivot portion has a first groove, a first shaft hole across the first groove, the first shaft mounted in the first shaft hole, so that the first shaft vertically intersects with the first groove, wherein the second pivot portion has a second groove, a second shaft hole across the second groove, the second shaft mounted in the second shaft hole, so that the second shaft vertically intersects the second groove;

a bearing installed in the middle hole, which has a mounting hole with the same central axis as the middle hole; and a brake ring, which has a brake hole arranged therein, a first arm coupled with the first shaft, a second arm coupled with the second shaft, the brake ring allows the first shaft and the second shaft to serve as swing fulcrums, and draws the main member to rotate around the bearing, wherein the first arm has a first slide matched to the first groove, and a first connection hole coupled with the first shaft; wherein the second arm has a second slide matched to the second groove, and a second connection hole coupled to the second shaft, wherein the first slide and the second slide each have a danger mark provided thereon, wherein when the brake ring is kept in the first position, the danger marks are hidden in the first groove and the second groove, wherein when the brake ring is in the second position, the danger marks are controlled to displace out of the first groove and the second groove.

13. The swivel anchor point, as recited in claim 12, wherein the bearing is detachably installed in the middle hole.

14. The swivel anchor point, as recited in claim 13, wherein the main member has a first end face and a second end face for the middle hole to penetrate longitudinally; wherein the bearing has a shoulder abutted against the first end face, and a screw portion protruded from the bottom end of the middle hole, and a nut capable of abutting abutted against the second end face, which screws with the screw portion, wherein the shoulder and the nut each have a wrenching part arranged thereon.

15. The swivel anchor point, as recited in claim 12, further comprising a detection structure is arranged on the first arm and the second arm, and is composed of a third connection hole, a first stopper, a fourth connection hole and a second stopper; wherein the third connection hole is arranged through the first slide and communicates with the first connection hole in parallel, so that the first stopper is formed between the third connection hole and the first connection hole to restrict the first shaft from being kept in the first connecting hole; wherein the fourth connection hole is arranged through the second slide and communicates with the second connection hole in parallel, so that the second stopper is formed between the fourth connecting hole and the second connecting hole to restrict the second shaft from being kept in the second connecting hole, wherein when synchronously matching with the first shaft to keep in the first connecting hole, so as to control the brake ring to keep in the first position; wherein when the brake ring is subjected to a set stress, the first shaft is controlled to be relatively displaced to the third connection hole, and the second shaft is controlled to be relatively displaced to the fourth connection hole, so that the brake ring is displaced from the first position to the second position.

16. The swivel anchor point, as recited in claim 13, further comprising a detection structure is arranged on the first arm and the second arm, and is composed of a third connection hole, a first stopper, a fourth connection hole and a second stopper; wherein the third connection hole is arranged through the first slide and communicates with the first connection hole in parallel, so that the first stopper is formed between the third connection hole and the first connection hole to restrict the first shaft from being kept in the first connecting hole; wherein the fourth connection hole is arranged through the second slide and communicates with the second connection hole in parallel, so that the second stopper is formed between the fourth connecting hole and the second connecting hole to restrict the second shaft from being kept in the second connecting hole, wherein when synchronously matching with the first shaft to keep in the first connecting hole, so as to control the brake ring to keep in the first position; wherein when the brake ring is subjected to a set stress, the first shaft is controlled to be relatively displaced to the third connection hole, and the second shaft is controlled to be relatively displaced to the fourth connection hole, so that the brake ring is displaced from the first position to the second position.

17. The swivel anchor point, as recited in claim 12, further comprising a detection structure is arranged on the first arm and the second arm, which by increasing the diameter of the first connection hole and second connection hole, is installed ductility bushings between the first shaft and the first connection hole, and between the second shaft and the second connection hole for compensation, so that the bushings are enough to keep the brake ring in the first position, but when the brake ring is subjected to a set stress, the first shaft and second shaft are controlled to generate a force sufficient to deform the bushings, causing the brake ring to shift to the second position.

18. The swivel anchor point, as recited in claim 13, further comprising a detection structure is arranged on the first arm and the second arm, which by increasing the diameter of the first connection hole and second connection hole, is installed ductility bushings between the first shaft and the first connection hole, and between the second shaft and the second connection hole for compensation, so that the bushings are enough to keep the brake ring in the first position, but when the brake ring is subjected to a set stress, the first shaft and second shaft are controlled to generate a force sufficient to deform the bushings, causing the brake ring to shift to the second position.

19. The swivel anchor point, as recited in claim 12, further comprising a detection structure is arranged on the first pivot portion and the second pivot portion.

20. The swivel anchor point, as recited in claim 13, further comprising a detection structure is arranged on the first pivot portion and the second pivot portion.

* * * * *